United States Patent
Lin et al.

(10) Patent No.: US 12,284,522 B2
(45) Date of Patent: Apr. 22, 2025

(54) SYSTEMS AND METHODS FOR PROTECTING BLUETOOTH LOW ENERGY DEVICES FROM ADDRESS TRACKING

(71) Applicant: Ohio State Innovation Foundation, Columbus, OH (US)

(72) Inventors: Zhiqiang Lin, Columbus, OH (US); Yue Zhang, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 662 days.

(21) Appl. No.: 17/506,011

(22) Filed: Oct. 20, 2021

(65) Prior Publication Data
US 2022/0124505 A1 Apr. 21, 2022

Related U.S. Application Data

(60) Provisional application No. 63/093,834, filed on Oct. 20, 2020.

(51) Int. Cl.
*H04W 4/80* (2018.01)
*H04W 12/122* (2021.01)

(52) U.S. Cl.
CPC .......... *H04W 12/122* (2021.01); *H04W 4/80* (2018.02)

(58) Field of Classification Search
CPC ...................................... H04W 4/80
USPC .......................................... 455/411
See application file for complete search history.

(56) References Cited

U.S. PATENT DOCUMENTS

| | | | |
|---|---|---|---|
| 9,185,100 B1* | 11/2015 | Juels | H04W 12/06 |
| 9,749,784 B1* | 8/2017 | Silva | H04W 64/00 |
| 11,930,435 B2* | 3/2024 | Fu | H04L 63/0876 |
| 2010/0302011 A1* | 12/2010 | Cervinka | H04W 52/0216 340/10.3 |
| 2015/0099555 A1* | 4/2015 | Krishnaswamy | H04W 4/70 455/509 |
| 2017/0302997 A1* | 10/2017 | Brown | H04N 21/44218 |
| 2020/0322791 A1* | 10/2020 | Hassan | H04L 63/123 |
| 2022/0124505 A1* | 4/2022 | Lin | H04W 12/122 |
| 2022/0369113 A1* | 11/2022 | Motos | H04L 9/001 |

OTHER PUBLICATIONS

B. W. Technology, "The unique bluetooth wristband that makes contact tracing and social distancing alerts," https://accent-systems.com/covid-19-contact-tracing-solution/, 2020.

(Continued)

*Primary Examiner* — Qutbuddin Ghulamali
(74) *Attorney, Agent, or Firm* — Meunier Carlin & Curfman LLC

(57) ABSTRACT

Bluetooth Address Tracking (BAT) is an allowlist-based side channel attack to track Bluetooth devices, by either passively sniffing the Bluetooth packets, or actively replaying the sniffed ones. Securing addresses of Bluetooth Low Energy (BLE) is described, which uses an interval unpredictable, central and peripheral synchronized random media access control (MAC) address generation scheme to defend against passive BAT attacks, and uses a current timestamp to derive random MAC addresses to defeat active BAT attacks, such that attackers can no longer be able to replay them.

21 Claims, 8 Drawing Sheets

(56) References Cited

OTHER PUBLICATIONS

M. Cominelli, F. Gringoli, P. Patras, M. Lind, and G. Noubir, "Even black cats cannot stay hidden in the dark: Full-band de-anonymization of bluetooth classic devices," in 2020 IEEE Symposium on Security and Privacy (SP). IEEE, 2020, pp. 534-548.
S. Bluetooth, "Bluetooth core specification version 4.2," Specification of the Bluetooth System, 2014.
Apple Inc., "Accessory Design Guidelines for Apple Devices) ," https://developer.apple.com/accessories/Accessory-Design-Guidelines.pdf, 2019.
S. Bluetooth, "Bluetooth core specification version 4.1," Specification of the Bluetooth System, 2011.
K. Fawaz, K.-H. Kim, and K. G. Shin, "Protecting privacy of ble device users," in 25th USENIX Security Symposium ( USENIX Security 16), 2016, pp. 1205-1221.
R. E. Khoury, "[android m feature spotlight] bluetooth scanning joins wifi to improve location accuracy," https://www.androidpolice.com/2015/05/29/android-m-feature-spotlight-bluetooth-scanning-joins-wifi-to-improve-location-accuracy/.
S. Bluetooth, "Bluetooth core specification version 5.0," Specification of the Bluetooth System, 2016.
Bluetooth-SIG, "Bluetooth core specification version 4.0," Specification of the Bluetooth System, 2010.
Ronyip, "Mitm attack on "just works" pairing," 2017 https://www.silabs.com/community/wireless/bluetooth/forum.topic.html/mitm_attac k_on_just-OoG9.
D. Johnson, A. Menezes, and S. Vanstone, "The elliptic curve digital signature algorithm (ecdsa)," International journal of information security, vol. 1, No. 1, pp. 36-63, 2001.
M. Haase, M. Handy et al., "Bluetrack—imperceptible tracking of bluetooth devices," in Ubicomp Poster Proceedings, vol. 2, 2004.
T. Issoufaly and P. U. Tournoux, "Bleb: Bluetooth low energy botnet for large scale individual tracking," in 2017 1st International Conference on Next Generation Computing Applications (NextComp). IEEE, 2017, pp. 115-120.
Google, "Android 6.0 changes," https://developer.android.com/about/versions/marshmallow/android-6.0-changes#behavior-hardware-id , 2016.
C. Zuo, H. Wen, Z. Lin, and Y. Zhang, "Automatic fingerprinting of vulnerable ble iot devices with static uuids from mobile apps," in Proceedings of the 2019 ACM SIGSAC Conference on Computer and Communications Security, 2019, pp. 1469-1483.
J. Uher, R. G. Mennecke, and B. S. Farroha, "Denial of sleep attacks in bluetooth low energy wireless sensor networks," in MILCOM 2016-2016 IEEE Military Communications Conference. IEEE, 2016, pp. 1231-1236.
K. Hypponen and K. M. Haataja, ""nino" man-in-themiddle attack on bluetooth secure simple pairing," in 2007 3rd IEEE/IFIP International Conference in Central Asia on Internet. IEEE, 2007, pp. 1-5.
D. Eastlake et al., "Transport layer security (tls) extensions: Extension definitions," RFC 6066, January, Tech. Rep., 2011.
M. Ossmann, "Project ubertooth: Building a better bluetooth adapter," 2011, shmooCon. [Online]. Available: http://ossmann.blogspot.com/2011/02/project-ubertooth-building-better.html.
H. WG, "Hid service specification 1.0," 2011.
Ganesh, "The current psoc ez-serial fw does not support rpa for whitelist," https://community.cypress.com/thread/51728?start=0&tstart=0, 2020.
Cypress, "Cypress official document," https://cypresssemiconductorco.github.io/btsdk-docs/BT-SDK/20721-B2_Bluetooth/API/, 2020.
S. Labs, "Whitelisting (silcon labs official document)," https://docs.silabs.com/bluetooth/3.0/general/adv-and-scanning/whitelisting, 2020.
J. K. Becker, D. Li, and D. Starobinski, "Tracking anonymized bluetooth devices," Proceedings on Privacy Enhancing Technologies, vol. 2019, No. 3, pp. 50-65, 2019.
G. Celosia and M. Cunche, "Saving private addresses: an analysis of privacy issues in the bluetooth-lowenergy advertising mechanism," in Proceedings of the 16th EAI International Conference on Mobile and Ubiquitous Systems: Computing, Networking and Services, 2019, pp. 444-453.
"Discontinued privacy: Personal data leaks in apple bluetooth-low-energy continuity protocols," Proceedings on Privacy Enhancing Technologies, vol. 2020, No. 1, pp. 26-46, 2020.
J. Martin, D. Alpuche, K. Bodeman, L. Brown, E. Fenske, L. Foppe, T. Mayberry, E. Rye, B. Sipes, and S. Teplov, "Handoff all your privacy—a review of apple's bluetooth low energy continuity protocol," Proceedings on Privacy Enhancing Technologies, vol. 2019, No. 4, pp. 34-53, 2019.
A. K. Das, P. H. Pathak, C.-N. Chuah, and P. Mohapatra, "Uncovering privacy leakage in ble network traffic of wearable fitness trackers," in Proceedings of the $17^{th}$ International Workshop on Mobile Computing Systems and Applications. ACM, 2016, pp. 99-104.
A. Becker and I. C. Paar, "Bluetooth security & hacks," Ruhr-Universität Bochum, 2007.
Y. Shaked and A. Wool, "Cracking the bluetooth pin," in Proceedings of the 3rd international conference on Mobile systems, applications, and services. ACM, 2005, pp. 39-50.
D. Spill and A. Bittau, "Bluesniff: Eve meets alice and bluetooth." WOOT, vol. 7, pp. 1-10, 2007.
M. Ryan, "Bluetooth: With low energy comes low security," in Proceedings of the 7th USENIX Conference on Offensive Technologies, ser. WOOT'13. Berkeley, CA, USA: USENIX Association, 2013, pp. 4-4. [Online]. Available: http://dl.acm.org/citation.cfm?id-2534748.2534754.
T. Rosa, "Bypassing passkey authentication in Bluetooth low energy." IACR Cryptology ePrint Archive, vol. 2013, p. 309, 2013.
D. Kügler, ""man in the middle" attacks on bluetooth," in International Conference on Financial Cryptography. Springer, 2003, pp. 149-161.
K. Haataja and P. Toivanen, "Two practical man-inthe-middle attacks on bluetooth secure simple pairing and countermeasures," IEEE Transactions on Wireless Communications, vol. 9, No. 1, 2010.
D. Antonioli, N. O. Tippenhauer, and K. Rasmussen, "Low entropy key negotiation attacks on bluetooth and bluetooth low energy." IACR Cryptol. ePrint Arch., vol. 2019, p. 933, 2019.
Y. Zhang, J. Weng, R. Dey, Y. Jin, Z. Lin, and X. Fu, "Breaking secure pairing of bluetooth low energy using downgrade attacks," in 29th {USENIX} Security Symposium ({USENIX} Security 20), 2020, pp. 37-54.
D. Antonioli, N. O. Tippenhauer, and K. Rasmussen, "Key negotiation downgrade attacks on bluetooth and bluetooth low energy," ACM Transactions on Privacy and Security (TOPS), vol. 23, No. 3, pp. 1-28, 2020.
D. Antonioli, et al., "Bias: Bluetooth impersonation attacks," in Proceedings of the IEEE Symposium on Security and Privacy (S&P), 2020.
M. Naveed, X. Zhou, S. Demetriou, X.Wang, and C. A. Gunter, "Inside job: Understanding and mitigating the threat of external device mis-binding on android," in 21st Annual Network and Distributed System Security Symposium, NDSS 2014, San Diego, California, USA, Feb. 23-26, 2014, 2014.
F. Xu, W. Diao, Z. Li, J. Chen, and K. Zhang, "Badbluetooth: Breaking android security mechanisms via malicious bluetooth peripherals," in Proceedings of the 26th Annual Network and Distributed System Security Symposium (NDSS'19), San Diego, CA, 2019.

* cited by examiner

SYSTEMS AND METHODS FOR PROTECTING BLUETOOTH LOW ENERGY DEVICES FROM ADDRESS TRACKING

CROSS-REFERENCE TO RELATED APPLICATIONS

This application claims the benefit of U.S. provisional patent application No. 63/093,834, filed on Oct. 20, 2020, and entitled "PROTECTING BLUETOOTH LOW ENERGY FROM ADDRESS TRACKING WHEN USING WHITELISTING," the disclosure of which is expressly incorporated herein by reference in its entirety.

STATEMENT OF GOVERNMENT SUPPORT

This invention was made with government support under grant number 1834215 awarded by the National Science Foundation. The government has certain rights in the invention.

BACKGROUND

Bluetooth Low Energy (BLE) is a short-range wireless communication technology that is ubiquitous for numerous applications such as home entertainment, health care, sports, retail, and digital contact tracing. To prevent a BLE device from being connected by untrusted devices, the BLE device uses a filter (i.e., an allowlist) that only accepts the allowed devices. Unfortunately, this allowlist introduces a side channel for attackers, because a device with the allowed list behaves differently when processing packets from listed devices as opposed to non-listed devices. While randomizing the media access control (MAC) address at both centrals (e.g., smartphones) and peripherals (e.g., keyboards) can mitigate this attack, it is noted that the MAC address randomization scheme specified in the current Bluetooth protocol is flawed and exposed to a replay attack with which an attacker can replay a sniffed MAC address to probe whether a targeted device will respond or not.

More particularly, BLE devices are subject to MAC address tracking because any nearby attackers can sniff the Bluetooth packets and associate them to particular devices or even users. This is because, when using BLE for communication, a peripheral without being connected will periodically (e.g., every 20 milliseconds) advertise its presence to nearby centrals with an Advertising Indication (i.e., ADV_IND) packet along with its MAC address. A nearby central (e.g., a smartphone) will typically respond the ADV_IND packet with a scan request (i.e., SCAN_REQ) containing the MAC addresses of both the central and the peripheral, to see whether the peripheral is a known or unknown device. Therefore, an attacker with a sniffer can observe MAC addresses being exchanged between Bluetooth devices to mount MAC address tracking attacks.

Bluetooth Special Interest Group (SIG) is aware of MAC address tracking threats, and has specified MAC address randomization using e.g., Resolvable Private Address (RPA) to protect the Bluetooth privacy. In particular, RPA allows paired devices (i.e., two devices that have exchanged cryptographic keys) to resolve the MAC address and recognize a peer device using Identity Resolution Key (IRK). With RPA, a Bluetooth MAC address will be changed periodically (e.g., every 15 minutes), thereby hindering address tracking attacks from nearby attackers.

However, MAC address tracking is still possible even though it is randomized, when the BLE device enables the "filter accept list" defined by Bluetooth SIG (referred to herein as "allowlist"), an access control feature used by a vast majority of BLE devices (e.g., Android phones, or iPhones). Specifically, when a Bluetooth device is configured with an allowlist, it behaves differently. For instance, a peripheral would ignore SCAN_REQ from unknown devices, and only respond with the SCAN_RSP for its allowed device. A central may directly go ahead to connect its allowed peripherals (much like a magnet) once receiving an advertisement packet. Therefore, by using a sniffer to collect and analyze the response of advertising packets, an attacker can track the sniffed MAC addresses and associate them to specific ones.

To fundamentally mitigate the MAC address tracking attacks, both centrals and peripherals must use RPA randomization, such that a new randomized MAC address can still be recognized based on the exchanged IRK. However, the current RPA randomization algorithm in Bluetooth specification is flawed and exposed to a replay attack with which an attacker can replay a sniffed MAC address to probe whether a peripheral or a central will respond or not. In particular, while a random address in RPA is generated from a random number and a pre-shared IRK between two paired devices, the current Bluetooth protocol does not specify how the random number should be chosen (other than mentioning that the random number should neither be all 0s nor all 1s), and no mechanisms are placed to prevent the reuse of an existing random number. Therefore, although an attacker cannot obtain the IRK, they can simply collect the sniffed MAC addresses and replay them to observe whether the devices are in the allowlist of a peripheral or a central.

It is with respect to these and other considerations that the various aspects and embodiments of the present disclosure are presented.

SUMMARY

Bluetooth Address Tracking (BAT) is an allowlist-based side channel attack to track Bluetooth devices, by either passively sniffing the Bluetooth packets, or actively replaying the sniffed ones. Securing addresses of BLE is described, which uses an interval unpredictable, central and peripheral synchronized random MAC address generation scheme to defend against passive BAT attacks, and uses a current timestamp to derive random MAC addresses to defeat active BAT attacks, such that attackers can no longer be able to replay them.

In an implementation, a method of defending against passive Bluetooth Address Tracking (BAT) attacks is provided. The method comprises: randomizing synchronization between a first device and a second device; randomizing an interval between the first device and the second device; and establishing communication between the first device and the second device.

In an implementation, a method of defending against active Bluetooth Address Tracking (BAT) attacks is provided. The method comprises: performing Resolvable Private Address (RPA) generation between a first device and a second device; performing RPA resolution between the first device and the second device; and establishing communication between the first device and the second device.

In an implementation, a system for defending against Bluetooth Address Tracking (BAT) attacks is provided. The system comprises: a passive BAT attack defense module configured to defend against passive BAT attacks to a first device or a second device; an active BAT attack defense module configured to defend against active BAT attacks to the first device or the second device; and an allowlist configured to allow communication between the first device and the second device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
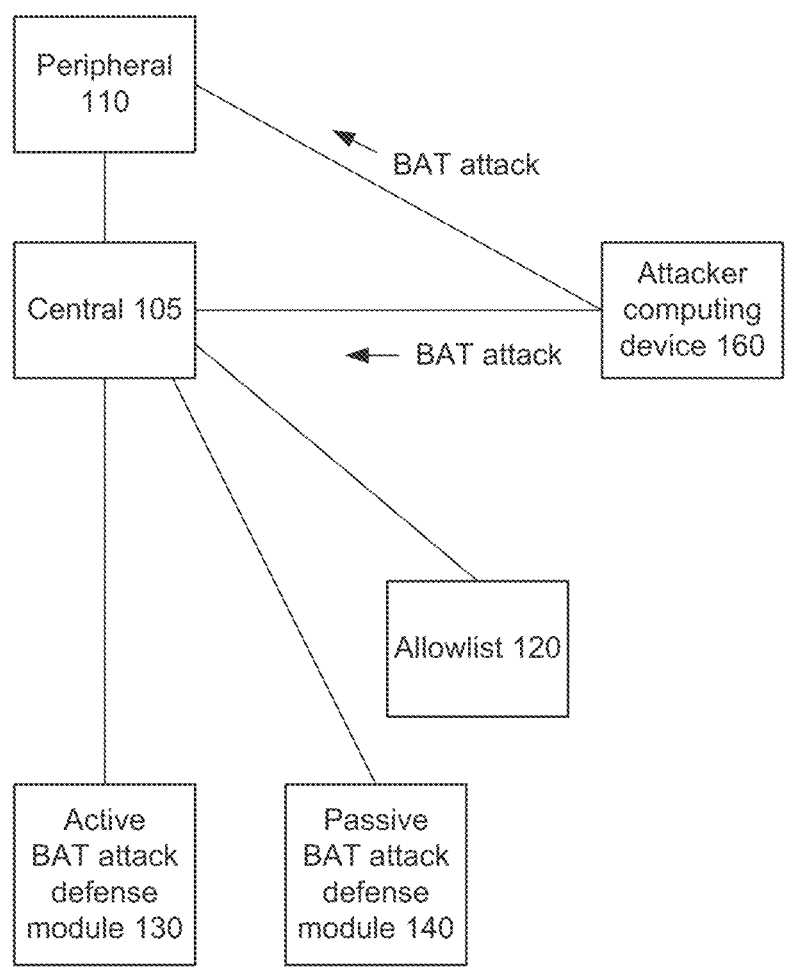
FIG. 1 is an illustration of an exemplary environment for protecting BLE devices from address tracking.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Systems and methods are provided directed to protecting Bluetooth Low Energy (BLE) devices from address tracking.

In a Bluetooth Address Tracking (BAT) attack, attacks work against devices during the advertising stage. Particularly, an attacker can either passively sniff the Bluetooth packets to identify allowlisting peripherals first and then associate the randomized MAC addresses sent to them to identify the corresponding centrals, or actively replay the sniffed MAC address of centrals to identify their association, or actively replay the sniffed MAC address of peripherals to attract known centrals. An attacker can use BAT attacks to monitor a user's status, track a user's past trajectory, or track a user's real time location.

It is noted that an allowlist, an otherwise beneficial feature in security, can introduce a side channel, enabling a passive attacker to potentially associate different MAC addresses. The current RPA randomization scheme is flawed, which allows an attacker to replay existing sniffed addresses for MAC address tracking.

As described further herein, a defense against active BAT attacks includes adding timestamps when generating and resolving the resolvable randomized MAC addresses to defeat the attackers to replay the Bluetooth MAC addresses, to ensure that each MAC address can only be used once (to prevent the replay attack). Moreover, a defense against passive BAT attacks includes the use of an interval unpredictable, central and peripheral synchronized RPA generation technique.

FIG. 1 is an illustration of an exemplary environment 100 for protecting BLE devices from address tracking. A central 105 and a peripheral 110 may each be a Bluetooth device in communication over BLE. An allowlist 120 is maintained, e.g., in storage associated with the central 105 and/or the peripheral 110, that permits the central 105 and the peripheral 110 to trust each other and connect to each other. In FIG. 1, the defenses are deployed at the central side, but they can be deployed on both the centrals or the peripherals depending on their security requirements and/or the implementation.

An attacker computing device 160 attempts to attack the Bluetooth devices using an active BAT attack and/or a passive BAT attack. An active BAT attack defense module 130 is provided to defend against (i.e., prevent) active BAT attacks by the attacker computing device 160, as described further herein. A passive BAT attack defense module 140 is provided to defend against (i.e., prevent) passive BAT attacks by the attacker computing device 160, as described further herein.

Figure 8:
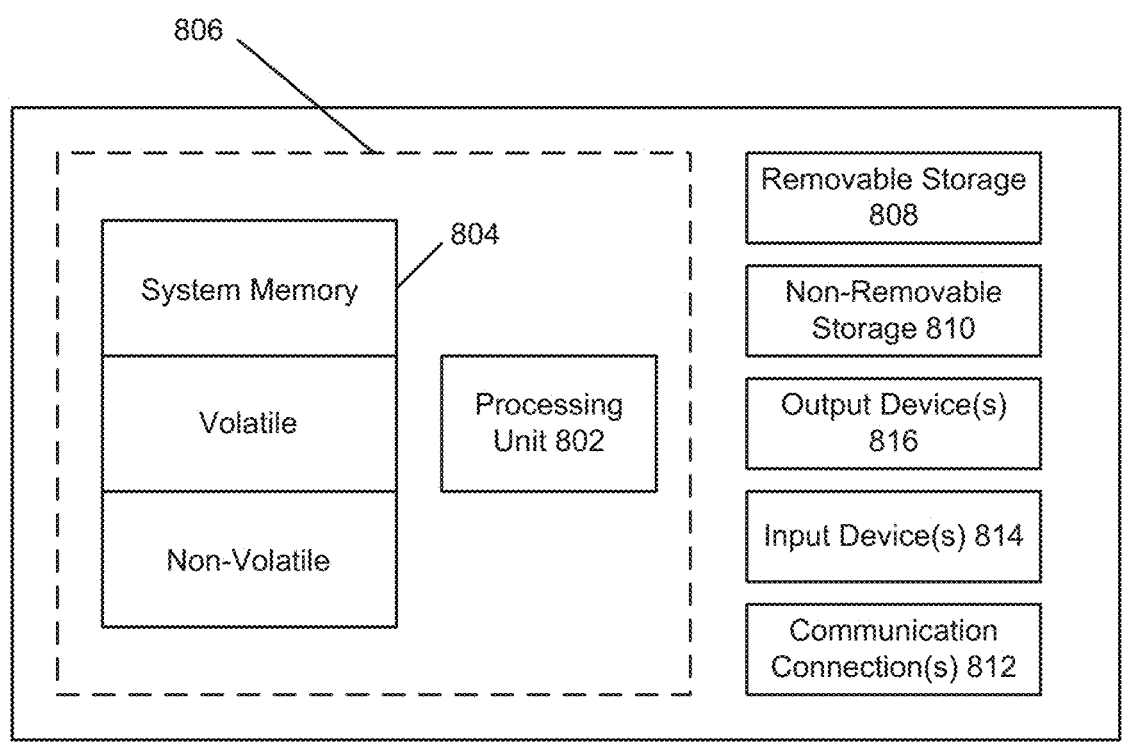
FIG. 8 shows an exemplary computing environment in which example embodiments and aspects may be implemented.

The allowlist 120, the active BAT attack defense module 130, and the passive BAT attack defense module 140 may be variously maintained on one or more computing devices (not shown) and/or the central 105 and/or the peripheral 110, depending on the implementation. Each of the one or more computing devices may be implemented using a variety of computing devices such as desktop computers, laptop computers, tablets, etc. Other types of computing devices may be supported. A suitable computing device is illustrated in FIG. 8 as the computing device 800.

Although only one central 105, one peripheral 110, one allowlist 120, one active BAT attack defense module 130, and one passive BAT attack defense module 140 are shown in FIG. 1, there is no limit to the number of centrals, peripherals, allowlists, defense modules, and computing devices that may be supported.

Figure 2:
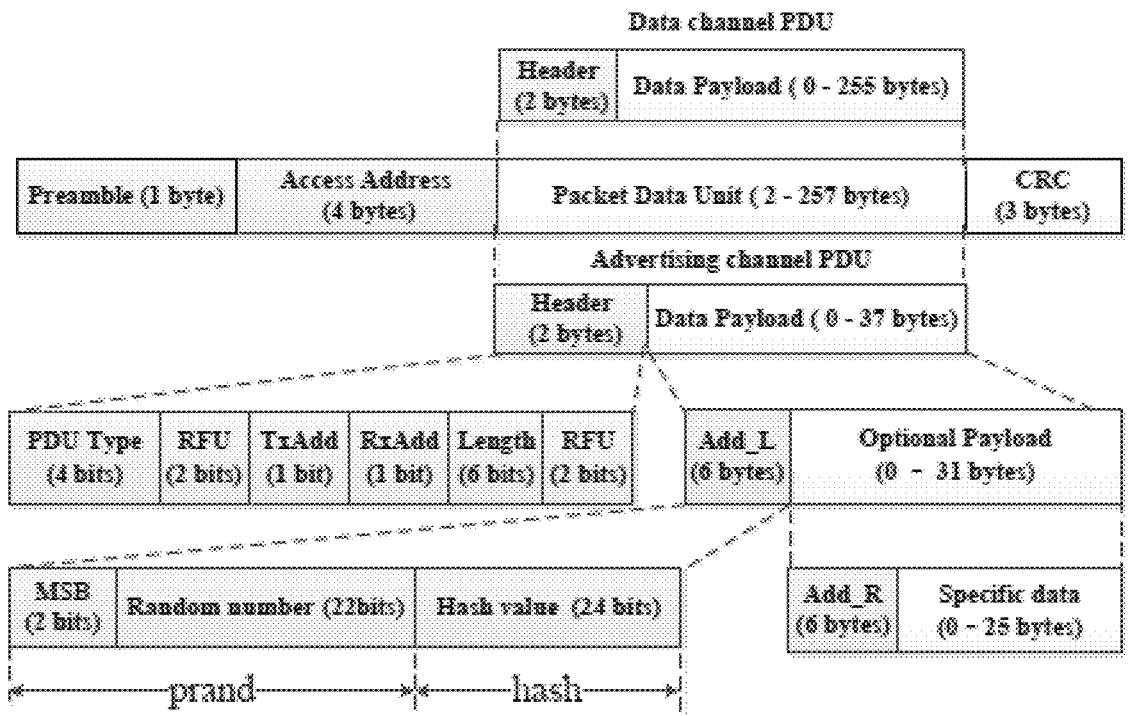
FIG. 2 is an illustration of an example format and layout of a Bluetooth packet.

FIG. 2 is an illustration of an example format and layout of a Bluetooth packet 200. As illustrated in FIG. 2, the layout of a typical Bluetooth packet 200 comprises: (i) the preamble for frequency synchronization, (ii) the access address for frequency identification (e.g., 0x8E89BED6 for advertising channel packets), (iii) the Packet Data Unit (PDU), and (iv) the cyclic redundancy check (CRC) code for error detection. Among them, the PDU can be an advertising channel PDU for connection or a data channel PDU for communication.

An advertising PDU includes the PDU header and data payload. In particular, a PDU packet header contains a 4-bits PDU type (e.g., CONNECT_REQ which indicates the device intends to connect to another device), 2-bits Reserved for Future Usage (RFU), 1-bit (i.e., static vs. randomized) MAC address type TxAdd of the sender, 1-bit MAC address type of the receiver RxAdd, 6-bits PDU length, and the other 2-bits RFU. The data payload consists of 6-bytes local Bluetooth address Add_L and an optional payload from 0 to 31 bytes, which includes the data used for connection (e.g., Add_R, the address of the remote device which the packet sender intends to connect).

Figure 3:
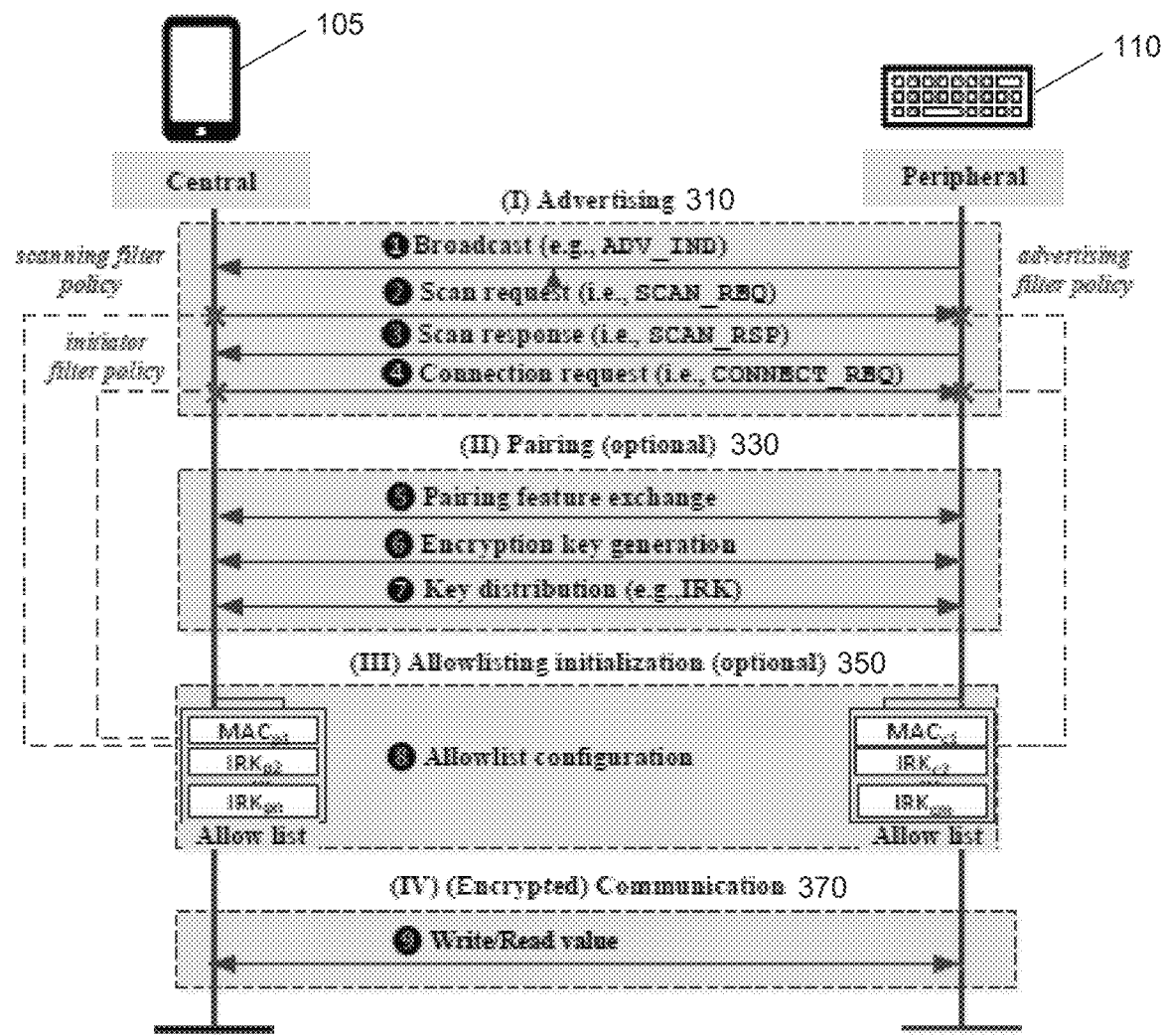
FIG. 3 is an illustration of an example BLE workflow and corresponding allowlist policy.

When using BLE for communications between a central 105 (e.g., a smartphone) and a peripheral 110 (e.g., a keyboard), it usually involves a number of steps. FIG. 3 is an illustration of an example BLE workflow and corresponding allowlist policy 300. As illustrated in FIG. 3, the workflow may have up to 9 steps, and these steps can be categorized into four stages: (I) advertising stage 310, (II) pairing stage 330, (III) allowlisting initialization stage 350, and (IV) communication stage 370, as further described herein.

(I) Advertising Stage 310. In the advertising stage 310, the central 105 and the peripheral 110 establish the connection by first broadcasting the presence from the peripheral 110, followed by a scan request to identify the corresponding centrals 105, or actively replay the sniffed MAC address of centrals 105 to identify their association, or actively replay the sniffed MAC address of peripherals 110 to attract known centrals 105. An attacker (e.g., the attacker computing device 160) can use BAT attacks to monitor a user's status, track a user's past trajectory, or track a user's real time location.

Figure 4:
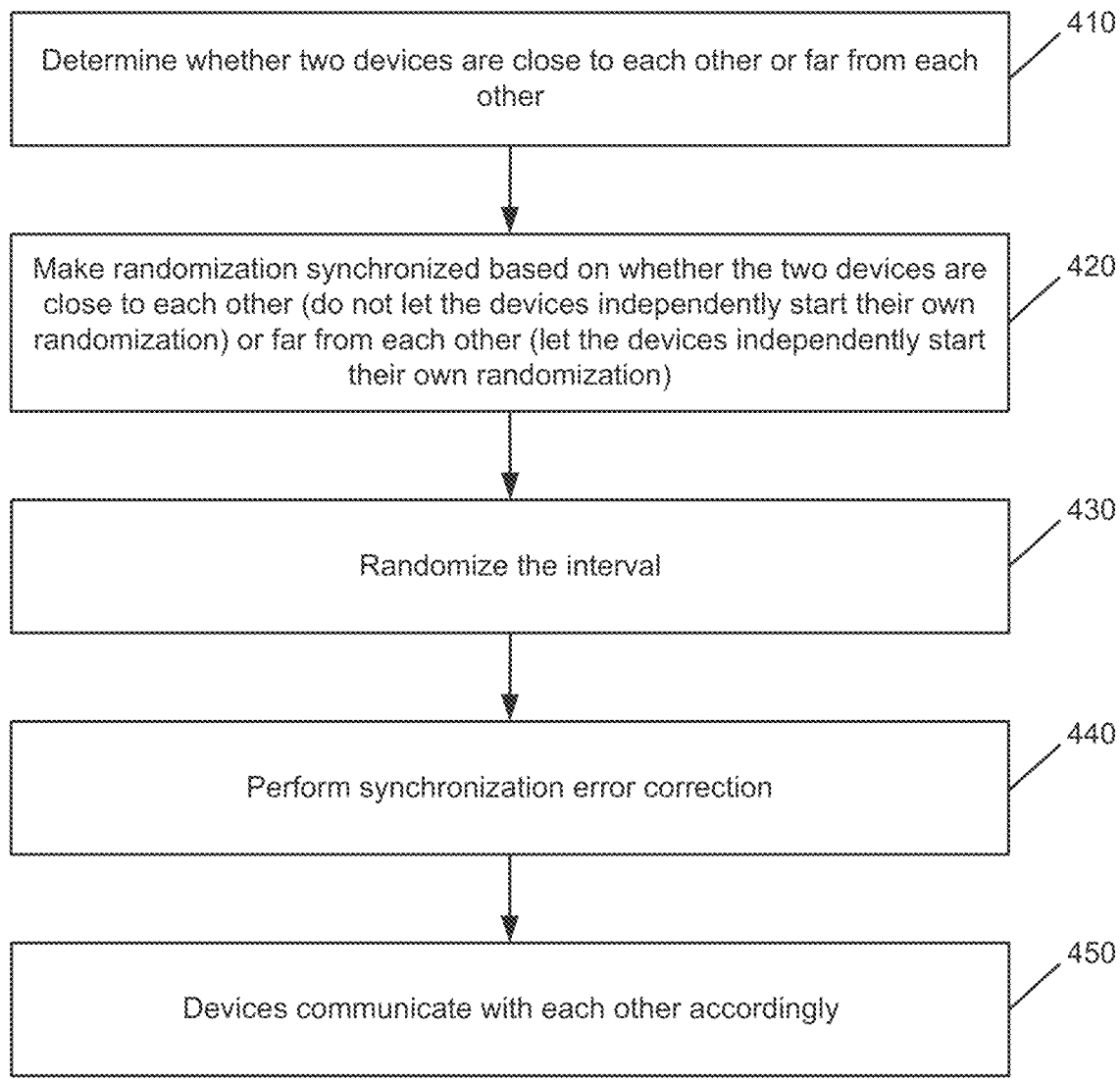
FIG. 4 is an operational flow of an implementation of a method of defending against passive BAT attacks.
Figure 5:
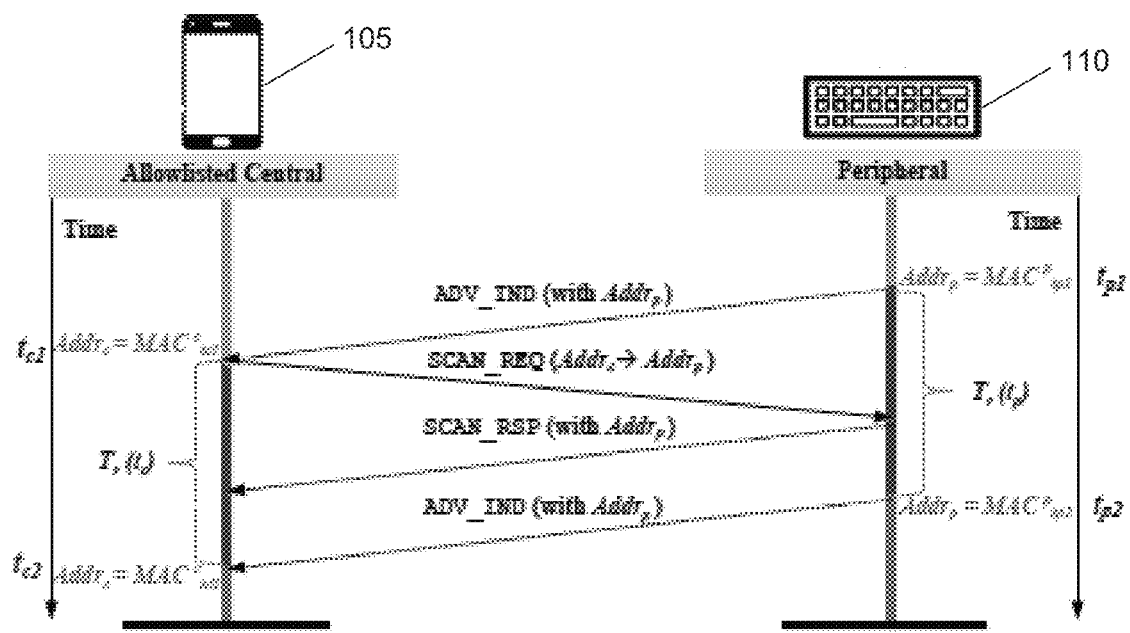
FIG. 5 is an illustration of an example status changing workflow in a passive defense.

To defend against passive BAT attacks, use an interval unpredictable, central 105 and peripheral 110 synchronized RPA generation technique, described further herein e.g., with respect to FIGS. 4 and 5. To defend against active BAT attacks, use the timestamps to generate the MAC addresses to ensure that each MAC address can only be used once (to prevent the replay attack) from the central 105, then a scan response from the peripheral 110, and finally a connection request from the central 105, described further herein e.g., with respect to FIGS. 6 and 7.

Step 1 Broadcast. In Bluetooth communication, the presence of a peripheral 110 must be known to the nearby centrals 105. This is achieved by broadcasting the packet that includes the MAC address of the peripheral 110 (in ADD_L), the PDU type of the advertisement (e.g., ADV_IND which indicates this device can be connected and scanned, or ADV_DIRECT_IND which indicates this device can only be connected by devices with the expected MAC address specified in the ADD_R field in the broadcast packet), and other optional information such as service UUIDs and manufacture data (e.g., manufacture ID). Note that there is a special type of Bluetooth device, namely the beacons, which only broadcast ADV_NONCONN_IND packets.

Step 2 Scan Request. When a central 105 receives an ADV_IND packet, typically it will respond with a Scan Request (i.e., PDU type SCAN_REQ). However, since Bluetooth 4.0 (a.k.a., Bluetooth Low Energy), a new allowlist 120 feature called scanning filter policy is introduced, with which a device such as a central 105 can configure to only respond its SCAN_REQ to the allowlisted devices. This allowlist 120 feature saves the energy of the central 105, and makes the communication more secure by only allowing connections with listed devices. However, smartphones typically do not configure this policy as it will prevent the smartphones from discovering new peripherals.

Step 3 Scan Response. When receiving a SCAN_REQ from a central 105, the peripheral 110 typically will respond with a Scan Response (i.e., PDU type SCAN_RSP). However, similar to the central 105 which can have a scanning filter policy, a peripheral 110 can have an advertising filter policy, allowing the peripheral 110 to only respond its SCAN_REQ to its allowlisted device. In addition to the advantages of using allowlist 120 in centrals 105, using allowlist 120 in peripherals 110 also enables security and privacy protection. In particular, Bluetooth protocol specification recommends only advertising sensitive data (e.g., static data such as manufacture information, device type such as keyboard) in SCAN_RSP (not in ADV_IND) to only trusted devices (i.e., the ones in its allowlist 120).

Step 4 Connection Request. When the central 105 receives a SCAN_RSP, it determines if the peripheral 110 is of its interest (e.g., a keyboard that is of interest to its OS, or a blood pressure that is of interest to its corresponding app). By default, the OS of the central 105 will not automatically initiate a Connection Request (i.e., PDU type CONNECT_REQ) to the peripherals 110, and a user or an app has to be involved to initiate the connection. However, after the central 105 has paired with a peripheral 110, it can maintain the paired peripheral 110 into its allowlist 105 with an initiator filter policy to decide whether to automatically initiate the connection whenever it sees the corresponding peripheral 110. The use of this allowlist policy can significantly improve the user experience, because it does not require the user to manually open the settings app of the OS or other 3rd-party apps to initiate the connection. For the peripheral 110, when receiving a CONNECT_REQ, it can also use the advertising filter policy as in Step 2 to decide whether to accept this CONNECT_REQ in the case that a central 105 directly connects to it without using SCAN_REQ.

(II) Pairing Stage 330. Pairing, which is optional, is used to negotiate cryptographic keys for the communication security and privacy and can be broken into three steps (from Step 5 to 7). In particular, in Step 5, in the Pairing Feature Exchange, the two devices exchange their pairing features (e.g., having a display or a keypad) which are needed to decide the appropriate pairing method such as Just Works, Passkey Entry, Out of Band, and Numeric Comparison (since Bluetooth 4.2). In Step 6, in the Encryption Key Generation, the two devices determine the type of pairing method based on the exchanged features and negotiate an encryption key. In Step 7, in the Key Distribution, the two devices exchange keys, and these include the encryption key and also the Identity Resolving Key (IRK), which is used for a BLE device to resolve its peer's randomized MAC address.

MAC address randomization is crucial for BLE security and privacy. A Bluetooth MAC address is a 48-bit value uniquely associated with a Bluetooth device. There are four types of MAC addresses: Public Address (PA), Static Random Address (SRA), Resolvable Private Address (RPA), and Non-Resolvable Private Address (NRPA). These address types can be identified by parsing both TxAdd and the two most significant (MSB) bits of ADD_L field.

Public Address (PA) (TxAdd=0): A PA is a globally static address assigned by the manufacturer. It never gets changed (serving as an identity for the device) and is vulnerable to address tracking attacks.

Static Random Address (SRA) (TxAdd=1, MSB=11): An SRA is randomly generated by the device when a device is rebooted or reset. It is vulnerable for address tracking if the device never reboots or resets.

Resolvable Private Address (RPA) (TxAdd=1, MSB=01): An RPA is generated using an IRK and it changes periodically (e.g., every 15 minutes). Only the paired device with a valid IRK can resolve the corresponding RPA to identify the known devices.

Non-Resolvable Private Address (NRPA) (TxAdd=1, MSB=00): An NRPA is randomly generated and changes periodically depending on the implementation. NRPA is intended to be never resolvable by any device. It can be noticed that only RPA can still be resolved by the peer devices if they know the corresponding IRK. This is useful for a peripheral 110 to remember the recognized centrals 105 or vice-versa.

The format of RPA and its generation and resolution process is now described. An RPA (e.g., an ADD_L) consists of prand and hash. The MSB of prand for RPA is fixed (i.e., MSB=01), and the rest of the prand are the random bits.

RPA Generation. To generate an RPA (48-bits), the central 105, denoted with symbol c, first selects a 24-bits prand (the first two bits are predefined), and then it feeds its IRK, assume $irk_c$, along with the selected prand into a pre-defined hash function H to get a 24-bits hash value $H(prand\|irk_c)$. Finally, the RPA of c, assume $rpa_c$, is generated by concatenating prand and the hash value: $rpa_c = prand\|H(prand\|irk_c)$.

RPA Resolution. When receiving an $rpa_c$ from a central 105, the peripheral 110 can resolve whether this RPA is from its "known" device. This is achieved through the RPA resolution. At a high level, the peripheral 110 will first split $rpa_c$ into two parts: prand and hash. Next, it iterates its known IRK list (each element of this list is added during the pairing), assume $irk_i$, to compute $hash' = H(prand\|irk_i)$. If hash' matches with the received hash value split from the $rpa_c$, then the device is resolved with the $irk_i$.

(III) Allowlisting Initialization 350 (Step 8). This is an optional stage depending on the implementation, and it is used to configure the allowlist 120 used by early Steps (e.g., 2, 3) for device filtering. To uniquely identify a device, the allowlist 120 feature relies on the IRKs transmitted at Step 7, and Step 8 adds the IRKs to the list with other information such as the address type. However, if the added device does not enable the address randomization, then the MAC address of the device instead of its IRK will be added into the allowlist 120.

Recall that there are three filtering polices: (i) scanning filter policy, (ii) advertising filter policy, and (iii) initiator filter policy. Among them, the advertising filter policy is deployed at the peripheral side, and the other two are deployed at the central side. While the scanning filter policy is defined in the specification, it is not appropriate to be deployed at the smartphones, since it will prevent the smartphones from discovering new BLE devices. Instead, the initiator filter policy is widely deployed in smartphones for auto-connection without any user involvement if a known peripheral is detected within its reach.

The Bluetooth protocol does not specify how many devices can be added into the allowlists 120. However, in practice it is determined that only one allowlisted central 105 can be added when enabled the advertising filter policy in a peripheral 110. As such, this policy allows a consistent one-to-one mapping between the allowlisting peripheral 110 and the listed central 105. However, when initiator filter policy is used at centrals 105, it allows multiple peripherals 110 to be added.

(IV) Communication Stage 370 (Step 9). After the first three stages, the two devices can now exchange data using a client-server (C/S) mode, either using encryption if they have exchanged cryptographic keys or plaintext if not. Specifically, the central 105 plays the client role, and the peripheral 110 acts as a server providing services to the client. A read request can be sent to the peripheral 110 if the central needs to read data from the server, or using a write request if the central 105 needs to submit data to the server.

BAT attacks are described. Many Bluetooth devices have adopted randomized MAC addresses such as RPAs. For instance, Google has enforced the use of RPA on all Android smartphones since 2016. The goal of a BAT attack is to show that the Bluetooth devices with RPA can still be tracked, allowing their users to be potentially de-anonymized (e.g., when the MAC address can be associated to a particular user).

Without loss of generality, define the objective of BAT attacks as follows: for a set of sniffed MAC addresses (regardless of how many BLE devices they belong to), assume $G(MAC) = \{MAC_{t_1}^{dev_1}, MAC_{t_2}^{dev_2}, \ldots, MAC_{t_n}^{dev_n}\}$ where $MAC_{t_x}^{dev_x}$ is the MAC of device $dev_x$ at the time $t_x$. For any two MAC addresses, assume $MAC_{t_a}^{dev_a} \in G(MAC)$, $MAC_{t_b}^{dev_b} \in G(MAC)$, $|t_a - t_b| > T$ where T is the randomization time interval (e.g., 15 minutes), the goal of BAT attack is to determine whether $dev_a = dev_b$. If so, the attacker (e.g., the attacker computing device 160) successfully associates the two MAC addresses. For example, assume at time $t_a$ the attacker observed a victim is at her office and sniffed an address $MAC_{t_a}^{dev_a}$, and at time $t_b$, the attacker sniffed an anonymous device with $MAC_{t_b}^{dev_b}$ in a Starbucks. If the attacker identifies that $MAC_{t_a}^{dev_a}$ and $MAC_{t_b}^{dev_b}$ are the ephemeral addresses of the same device (e.g., a user's smartphone), the attacker then successfully associates these two addresses.

A key observation of BAT attacks is that the use of the allowlist 120 forces the devices to behave differently when receiving packets from their listed (i.e., known) and non-listed (i.e., unknown) devices, and such a single bit side channel information can allow an attacker to associate Bluetooth MAC addresses. Because the attacker is able to either (i) passively sniff the BLE traffic or (ii) actively modify the traffic, it leads to two types of BAT attacks: passive BAT attacks and active BAT attacks.

Passive BAT attacks passively sniff the advertising packets between centrals 105 and peripherals 110, to see whether a peripheral 110 will selectively respond SCAN_REQ (i.e., reply with a SCAN_RSP or no reply at all); if so, attackers use this single bit to associate (i.e., track) the corresponding centrals 105 into unique ones based on the observed MAC addresses.

Passive attacks only sniff the broadcasting traffic of BLE devices and rely on the different response signals from devices with allowlist 120 to associate (i.e., track) the sniffed MAC addresses. Because broadcasting traffic starts from peripherals 110, first identify the allowlisting peripheral from the sniffed BLE packets, and then associate the randomized sniffed MAC addresses to the corresponding centrals 105.

Attack Example I: Monitoring a victim's status. The passive BAT attack is particularly useful to monitor the status of a targeted victim (e.g., whether or not the targeted victim is in a specific location). For example, assuming victim Alice is using a stationary allowlist-enabled Bluetooth-keyboard in her workspace to connect her smartphone, a passive-attacker is able to sniff the exchanged-packets (up to 2000 feet away when using an amplified antenna such as RP-SMA-R/A) between the keyboard and the smartphone to know when Alice enters her workspace, assume multiple smartphones are nearby to her keyboard.

Active BAT attacks actively manipulate the packets, e.g., forging new packets, or replaying the old packets, to observe how a peripheral 110 or a central 105 behaves. If there are distinctive behaviors observed, their corresponding MAC addresses are associated too.

The passive attack will fail when both the peripheral 110 and the central 105 have used RPA-type of MAC addresses, or when they are not close to each other (the attacker cannot observe the traffic being exchanged between them). Therefore, active BAT attacks can be designed with which attackers can actively inject (e.g., via forging) traffic to BLE devices to observe how they will respond. This is possible because Bluetooth is a wireless communication technology, and it is easy for an attacker to program a malicious central (e.g., a smartphone owned by attacker) or a malicious peripheral (e.g., a development board, or a smartphone since it can also be configured to be a peripheral) to broadcast arbitrary packets of interests. Therefore, a question becomes what kind of packets the attacker has to forge.

When inspecting the BLE traffic of the advertising stage, as shown in FIG. 3, notice that there is no encryption, and thus the attacker can inject arbitrary packets. The only secret is the randomized MAC addresses sent by centrals 105 and peripherals 110. However, when devices use the allowlist 120, they must use RPA that relies on the exchanged IRKs for their randomized MAC addresses generation. Therefore, the sniffed RPA-type MAC addresses can be replayed to probe how a central 105 or a peripheral 110 would respond, then the attacker can still launch the BAT attack.

The goal of a malicious central based active BAT attack is to use the malicious central to first identify the allowlisting peripheral 110, from which to further track the allowlisted central 110.

Attack Example II: Tracking a victim's past trajectory. Assume Alice is using her smartphone to communicate with her stationary allowlist-configured Bluetooth keyboard p in her workspace, and the attacker is able to collect one of its MAC addresses (assume $MAC_{t_1}^p$). When at $t_2$ Alice is away from her workspace, the attacker aims to know where Alice has been to. To this end, the attacker deploys beacon-alike sniffers (everywhere or just a few targeted places) that broadcast the ADV_IND packets with $MAC_{t_1}^p$ to collect the MAC addresses of all nearby centrals in their SCAN_REQS (assume $MAC_{t_1}^{c_i}$, $MAC_{t_2}^{c_j}$, $MAC_{t_2}^{c_k}$). Then, at $t_3$, the attacker approaches Alice's workspace, and uses a malicious central to replay the collected SCAN_REQs with $MAC_{t_2}^{c_i}$ to Alice's p to test whether it responds. If so, the attacker knows $c_i$ is Alice's phone, and if $MAC_{t_2}^{c_i}$ was collected from Starbucks (based on the sniffer's location), the attacker knows Alice was in (or near) the Starbucks.

Attack Example III: Tracking a victim's real-time location with tunneling. In attack example II, the attacker has to wait at $t_3$ to detect Alice's past trajectory, because there is no direct communication channel between the wild centrals and p. Therefore, if the attacker is able to build a tunnel to relay the sniffed SCAN_REQS directly to p in Alice's workspace, then the attacker would be able to instantly know Alice's location. This leads to a third attack example, which is to additionally build a tunnel between the wild sniffers and p using attacks such as the wormhole attack. Details are omitted for brevity because such a tunneling attack is well-known, and also the rest is similar to attack example II.

Active BAT attacks from malicious peripherals are now described. Using malicious centrals to probe true peripherals relies on the allowlist of the advertising filter policy in the peripherals. However, not all peripherals enable this policy, and instead many centrals (e.g., Android mobiles, iPhone and Windows tablets) have enabled the initiator filter policy, which will instantly respond to the "known" peripherals (by storing the peripheral's IRK) once they are in their range. Therefore, another active attack uses spoofed packets generated from a malicious peripheral, which broadcasts the advertising packets to all nearby centrals, and only the central enabled the initiator filter policy will respond, allowing an attacker to instantly know a central's location.

Attack Example IV: Tracking a victim's real-time location without tunneling. Building a tunnel might be expensive. There is no need to do so if attackers use malicious peripherals to associate centrals with the initiator filter policy. Still assume Alice uses her phone that configured the initiator filter policy to automatically communicate with her Bluetooth keyboard p in her workspace, and at $t_1$ the attacker is able to observe one of its MAC address $MAC_{t_1}^p$. Then later at $t_2$ when Alice is away from her workspace, the attacker directly uses beacon-alike sniffers to advertise $MAC_{t_1}^p$ to nearby centrals, and if a central instantly connects the sniffer with a CONNECT_REQ, then the attacker knows Alice's real-time location.

Other attacks are contemplated. For example, having identified the central, the attacker can meanwhile track the peripherals if the peripherals are also mobile devices with RPA randomization. To this end, at time $t_3$, the attacker can change the address of the malicious peripheral to any targeted addresses (e.g., $MAC_{t_2}^p$), and start broadcasting. If the identified central initiates CONNECT_REQ to this malicious peripheral, the attacker can know $MAC_{t_2}^p$ and $MAC_{t_1}^p$ belong the same peripheral or at least known peripherals to this central.

Defending against passive BAT attacks is described. Passive attacks are challenging to be defeated because fundamentally the devices have to respond differently when allowlist 120 is used. To defend against the passive attacks, use address randomization at both sides (the central 105 and the peripheral 110) with randomized intervals based on the observation that within a given time interval, although the attacker (e.g., the attacker computing device 160) can observe the devices respond differently when allowlist 120 is used, the attacker cannot identify the devices 105, 110 across intervals because the length of each time interval is randomized, thereby defeating the tracking.

FIG. 4 is an operational flow of an implementation of a method 400 of defending against passive BAT attacks. The method 400 may be performed using the environment 100 in some implementations. FIG. 5 is an illustration of an example status changing workflow 500 in a passive defense.

When MAC address randomization occurs at both centrals and peripherals, theoretically, the attacker cannot track the devices across the randomization intervals. However, two challenges to solve are: (1) making MAC randomization at both sides synchronized otherwise c and p do not know it is in the i-th interval, and (2) making the length of the interval random otherwise a repeatable time interval (e.g., every 15 minutes) allows attackers to associate the randomized.

Making randomization synchronized is described. It is described how the two devices change their addresses and when it is time for them to perform the address randomization. Because the central and the peripheral may not always be close to each other (e.g., the user could take her central away, and vice versa, or one of them is turned off), and if they are not close to each other, the two devices cannot communicate to decide how they could change their addresses. Therefore, two cases are considered: (i) the two devices are close to each other, and (ii) the two devices are far away.

At 410, it is determined whether the two devices (the central 105 and the peripheral 110) are close to each other or far from each other.

At 420, randomization is synchronized based on whether the two devices are close to each other or far from each other. When the two devices are close to each other, the devices are not permitted to independently start their own randomization. When the two devices are far from each other, let the devices independently start their own randomization.

(i) Two devices are close to each other. In this case, the peripheral 110 and the central 105 independently cannot be allowed to start their own randomization; otherwise their randomization may cross interval (due to clock skews and the elapsed packet travel time between them), leaving traces to attackers. Note the allowlisting always starts from the peripheral when advertising its presence, and then the central responds. Therefore, leverage this causality for the synchronization and let the randomization start right before the peripheral starts to send the ADV_IND at the peripheral side, and the central starts right after it receives the corresponding ADV_IND, as illustrated in FIG. 5. As such, attackers will only observe an always synchronized randomization across an unpredictable interval, and they cannot associate the MAC addresses across randomization intervals anymore.

(ii) Two devices are far away. In this case, let the central 105 and the peripheral 110 independently start their own randomization, because the attacker can no longer associate the addresses through observing devices' SCAN_REQ and SCAN_RSP. Assume a central and a peripheral passed through N times of synchronized address randomization (they were always close to each other, which means they used the mechanism discussed in (i) to change their addresses), and now they are in their (N+1)-th synchronized address randomization. Within the interval (e.g., 15 minutes), the central 105 is taken away by the user, and they are no longer close to each other (using the case where the central 105 is away from the peripheral 110 as an example, while it is the same if the peripheral 110 is away from the central). As a result, the peripheral 110 will not be able to receive any SCAN_REQ from its allowed central 105. When it is time to change the address, the peripheral 110 will fetch its own time $T_p$ through getCurrentTime(p) and generate a random address $rpa_p$. Because the central 105 is not nearby, the lifetime of such a generated $rpa_p$ can be a random time period without notifying the central 105 for synchronization. The peripheral 110 will continue to generate new RPAs using its freshest timestamps, and each of those RPAs will have a random lifetime.

When the central 105 is back, the peripheral 110 will resume its state by re-entering its (N+2)-th address randomization. Specifically, because the peripheral 110 keeps broadcasting, and whenever the central 105 is close to it, the central 105 can recognize it by correctly resolving its RPA. Then, the central 105 sends a SCAN_REQ, which contains its newest RPA that generated from the freshest timestamp, to notify the peripheral 110 that it is back. When the peripheral 110 receives the RPA, it enters the (N+2)-th synchronized address randomization, and then the central 105 also enters the (N+2)-th synchronized address randomization when it receives the ADV_IND from the peripheral 110. The following procedures are the same as that in case (i), which are omitted for brevity.

At 430, the interval is randomized. The randomization interval needs to be a secret and unpredictable to attackers. To achieve that, the two devices (the central 105 and the peripheral 110) can introduce a new secret value or reuse existing ones (e.g., IRK) to derive the randomized intervals. The secret also needs to be updated dynamically at both sides (the central 105 and the peripheral 110) to ensure that the random intervals can also change simultaneously. As such, use the hash of an auto-incremented secret to derive the random interval, because every time the value of such derived secret changes, the derived random interval changes as well.

The two devices can use an existing secret S (e.g., the LTK, or the IRK) with an automatic increment to derive the random intervals. Assume there is an $S_0$, which can be the IRK, and every time the interval $S_j$ is updated, automatically increase it by k (which can be one or any other predefined number) from previous $S_i$. $S_j=S_i+k$ where $S_0$ is assumed to be the IRK for simplicity. Then, derive the length of the randomized interval at the i-th interval $T_r(i)=H(S_i) \bmod T_{max}$, where $T_{max}$ is set to be 15 minutes, and $H(S_i)$ is the hash of $S_i$. As such, at any given time interval i, both the central 105 and the peripheral 110 will have a predetermined random interval $T_r(i)$ unknown to attackers once $S_0$, the initial secret, is exchanged.

Also, note that there has to be a unique secret S for each paired central 105 and peripheral 110. But one central (e.g., a smartphone) can be paired with multiple peripherals. Therefore, the random interval and IRK must be S-specific. That is, a central needs to use different intervals and RPA-type MAC addresses correspondingly to connect its paired peripherals.

At 440, synchronization error correction is performed. It is possible that the two paired devices may be out of synchronization, e.g., it is supposed to be i-th interval, but for some reasons (e.g., one of them lost its battery) the peripheral 110 or the central 105 may still be in the previous (i-1)-th interval or even more, and such errors are to be corrected. Because the allowlisting always starts from the peripheral 110 when advertising its presence, and then the central 105 responds, the central 105 can identify the fact that at the very first time: if the central 105 notices that the peripheral 110 changes the MAC address to an earlier or later one than it should be, the central 105 knows that the two devices are out of synchronization. Therefore, let the central 105 always correct its interval based on the peripheral's interval.

The synchronization error correction approach is straightforward. Assume when errors occur, the peripheral 110 or the central 105 is in the previous (i−δ)-th interval, where δ is a very small integer (e.g., one or two) in practice, although in theory the worst case δ could be i, which would require more computational resources to correct it. When the central 105 notices that the two devices get out of synchronization by observing whether the peripheral's interval equals its own currently used interval, the central 105 starts the error handling process: the central 105 first calculates a few intervals (e.g., (i−1)-th interval) that are close to the currently used interval (assume it is the i-th interval) based on the algorithm of how $T_r(i)$ is derived, e.g., $T_r(i-1)=H(S_{i-1}) \bmod T_{max}$, $T_r(i-2)=H(S_{i-2}) \bmod T_{max}$, and compares those calculated intervals to check if any of them equals to the peripheral's interval. If so, the central 105 updates its i (the current interval) correspondingly, and the error is corrected (the central 105 and the peripheral 110 now have the same i).

Note that there could be a case where the central's calculated intervals are the same (e.g., $T_r(i)=T_r(i-1)$ due to a partial hash collision) and they all equal to the peripheral's currently used interval. In this case, the central can choose either i or i−1, as the i-th interval and wait to check whether the peripheral's upcoming interval equals to its own interval in the next time of address randomization. If so, the error is corrected to the most recent i; otherwise, the central will need to keep performing the error correction until the error gets corrected.

Other alternative approaches are described. Instead of using the autoincremented secret to derive the random interval, one may use the hash chain of the initial secret to derive it. That is, $T_r(i)=H^i(S_0) \bmod T_{max}=H(H( \ldots H(S_0)\ldots )) \bmod T_{max}$ where $T_{max}$ is set to be 15 minutes, and $H^i(S_0)$ is calculated by hashing i times of the original secret $S_0$. As such, for a central and a peripheral that have already exchanged their secret $S_0$, at any given moment, the i-th random interval $T_r(i)$ can be calculated, but attackers without the secret will not be able to predict any of those intervals. However, when errors occur, it is impossible to calculate a previously used the hash chains of the secret $H^{i-1}(S_0) \bmod T_{max}$ using the current hash chains of the secret. Re-calculate all the used ones (i.e., from $H^0(S_0) \bmod T_{max}$ to $H^{i-2}(S_0) \bmod T_{max}$) a second time to get $H^{i-1}(S_0) \bmod T_{max}$, or save k previously used hash chains of the secret, so there is no need to recalculate it from the start. However, extra storage resources are required, depending on the size of k. Therefore, when compared with using the hash of an autoincremented secret, using hash chains of the secret to correct errors could be less practical.

At 450, the two devices can communicate with each other, with the threat of passive BAT attacks being removed.

Defending against active BAT attacks is described. Fundamentally, active BAT attack works because the current RPA-type MAC address generation suffers from the replay attack.

Figure 6:
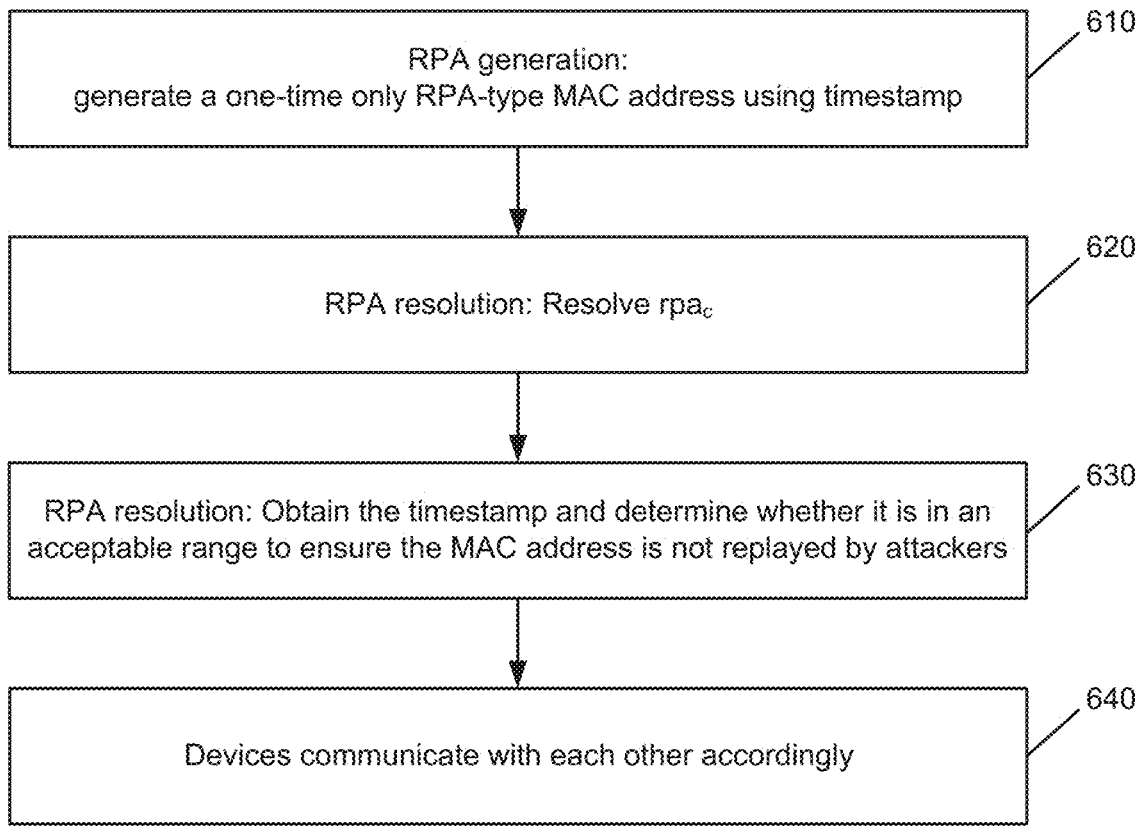
FIG. 6 is an operational flow of an implementation of a method of defending against active BAT attacks.
Figure 7:
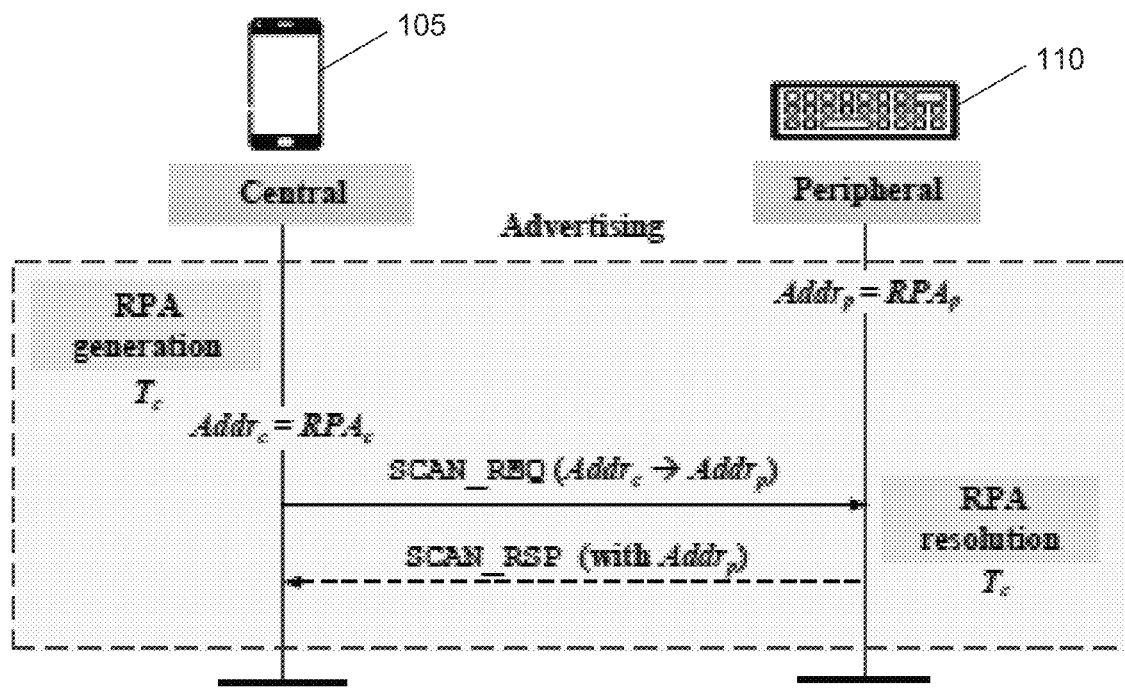
FIG. 7 is an illustration of an example workflow of an active defense.

FIG. 6 is an operational flow of an implementation of a method 600 of defending against active BAT attacks. The method 600 may be performed using the environment 100 in some implementations. FIG. 7 is an illustration of an example workflow 700 of an active defense.

A well-known defense against a replay attack is to add random sequence numbers. Theoretically, add a synchronized, auto-incremented sequence number, together with the random number prand, to generate a one-time only RPA-type MAC address, which can only be used within a given period depending on the configuration. However, this defense will introduce extra storage and communication overhead. Although for two devices (e.g., a central 105 and a peripheral 110), negotiating and storing one sequence number may not cost too much storage and communication resources, the maintenance of such sequence number can be challenging. For example, the central 105 and the peripheral 110 must update their negotiated sequence number simultaneously to ensure they maintain the same sequence number; otherwise, the generated MAC address may not be correctly resolved. One solution is to let the central 105 and the peripheral 110 update their sequence number every minute based on their local clocks ever since they paired. However, the time can get out of synchronization due to various reasons (e.g., clock skews), and there may be a need to force the two devices to synchronize their clocks every a few days.

Intuitively, the two devices can also use their storage to save the used MAC addresses and defend against active BAT attacks. The idea of the defense is straightforward: instead of modifying the way of RPA generation and resolution, the two devices directly save all the used RPAs in their database. When one of the devices receives a valid RPA, it checks whether the RPA is in its database. If yes, the device rejects the RPA. Otherwise, it accepts the RPA and saves it into its database. However, such solution is far from practical for two reasons: First, obsequiously, the solution cost a lot of storage resources. Assume a device changes its address every 15 minutes, its peer needs to consume 365× 24×4×48=1,681,920 MB each year to just save these addresses (each address is 48 bytes). Given the firmware of Bluetooth devices usually have very limited storage (e.g., a few hundred KB), they cannot afford such huge storage consummation. Second, when the stored addresses reaches a considerable volume, quickly fetching these addresses is another challenge. This is particularly true for the Bluetooth IoT devices, which usually have very limited computational resources.

Therefore, as described further herein, use the timestamps (instead of the random number prand) to generate a one-time only RPA-type MAC address, which can only be used within a given period depending on the configuration.

At 610, RPA generation is performed. A one-time only RPA-type MAC address is generated using a timestamp. Note that a timestamp increases automatically when time passes by. Using timestamps instead of prand will not downgrade the security of the protocol. Although the timestamps are predictable and known to attackers, the generated MAC address changes every time and the attacker still cannot recognize any of these random MAC address (the attacker cannot uniquely identify a MAC address through its timestamp part, given they are the same for all devices). This approach does not heavily consume either the storage resources or communication resource. Also, because timestamps are used in the MAC addresses, the devices can easily detect the replay attack if a timestamp comes from an older time by saving and comparing with the most recent known timestamp.

More particularly, the active defense technique uses the existing protocol without adding any extra field in the protocol but only modifying the central 105 and the peripheral 110 to process the timestamp, as illustrated in FIG. 7. RPA generation and RPA resolution are described herein, with the assumption that the peripheral 110 has enabled allowlist 120 (because the defense workflow for the central 105 with allowlist 120 is similar, it is omitted herein for brevity). The defense described herein also works when both the peripheral 110 and the central 105 enable the allowlist 120.

RPA generation is described. When a central c receives an advertising packet from a peripheral p, it uses its $irk_c$, and the current time $T_c$ to generate its current $rpa_c=(T_c \| H(T_c \| irk_c))$. After that, c can send this newly generated $rpa_c$ as usual in its SCAN_REQ or CONNECT_REQ to p. Note that the timestamp $T_c$ should be used in the following sessions within a random interval (e.g., 15 minutes) to avoid the central changing its addresses too often.

RPA resolution is then performed. At 620, $rpa_c$ is resolved. When p receives a SCAN_REQ (or CONNECT_REQ) with an $rpa_c$, it resolves this $rpa_c$ using its stored $irk_c$ as follows: First, follow the initial RPA resolution by splitting $rpa_c$ into two parts: the timestamp $T_c$ and hash. Next, after feeding the hash function H with two inputs $irk_c$, and $T_c$ to compute the hashed value: Hash'=$H(T_c \| irk_c)$. If hash equals to hash', this $rpa_c$ is resolved.

At 630, RPA resolution continues by obtaining the timestamp and determining whether it is in an acceptable range. More particularly, p will check whether or not $T_c$ is in an acceptable range to ensure the MAC address is not replayed by attackers. To this end, p will compare the received $T_c$ encoded in the MAC address with the saved newest timestamp (assumed $T_c'$; if $T_c'$ is empty, and it directly updates to the received $T_c$), and compare $T_c'$ and $T_c$. At a high level, this comparison can have at most three different outcomes: (i) $T_c$ is larger than $T_c'$. If so, p directly updates the saved timestamp $T_c'$ to $T_c$ for future references. (ii) $T_c'$ equals to $T_c$. If so, p will check whether or not $T_c$ is a valid one by checking whether or not the lifetime of a specific $rpa_c$ has already exceeded the predetermined address randomization interval $T_r$, and denote it to $T_r(i)$ assume the current interval is the i-th interval. Assume $T_c'$ was last updated at $T_{p0}$ and now the comparison is at $T_{p1}$, which gives: $T_{p1}-T_{p0}<T_r(i)$ where $T_r(i)$ is the current address randomization interval. If the above equation does not hold, p rejects this MAC address. Otherwise, it accepts. (iii) $T_c$ is smaller than $T_c'$, which means the address is a used one (p should reject it to prevent replay attacks).

Finally, if central's time is not very accurate (e.g., the clock always runs 5 seconds slower than the standard time), there could be a new side channel attack that can work against the defense. For example, it would be trivial for the attacker to track the central (by observing whether or not the time of a central is always 5 seconds slower than the others). Therefore, to ensure the security of the protocol, let the centrals use the standard time (because all the devices will have the same standard time if they can synchronize through the Internet), and then attackers cannot differentiate any of the centrals by using the time differences.

At 640, the two devices can communicate with each other, with the threat of active BAT attacks being removed.

FIG. 8 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by the device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communication connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

In an implementation, a method of defending against passive Bluetooth Address Tracking (BAT) attacks comprises: randomizing synchronization between a first device and a second device; randomizing an interval between the first device and the second device; and establishing communication between the first device and the second device.

Implementations may include some or all of the following features. The method further comprises performing synchronization error correction after randomizing the interval. The first device and the second device are Bluetooth Low Energy (BLE) devices. The first device is a central device and the second device is a peripheral device. Randomizing synchronization between the first device and the second device is based on a distance between the first device and the second device. When the distance between the first device and the second device is less than or equals a predetermined threshold, then the first device and the second device cannot independently start their own randomization. When the distance between the first device and the second device is greater than the predetermined threshold, then the first device and the second device can independently start their own randomization. The method further comprises determining whether the first device and the second device are close to each other or far from each other, and the randomizing synchronization is based on whether the first device and the second device are close to each other or far from each other.

In an implementation, a method of defending against active Bluetooth Address Tracking (BAT) attacks comprises: performing Resolvable Private Address (RPA) generation between a first device and a second device; performing RPA resolution between the first device and the second device; and establishing communication between the first device and the second device.

Implementations may include some or all of the following features. The first device and the second device are Bluetooth Low Energy (BLE) devices. The first device is a central device and the second device is a peripheral device. Performing RPA generation comprises generating a one-time only RPA-type media access control (MAC) address using a timestamp. Performing the RPA resolution comprises obtaining a timestamp and determining whether it is within a range to ensure the MAC address is not replayed by an attacker. The method further comprises enabling an allowlist at the first device.

In an implementation, a system for defending against Bluetooth Address Tracking (BAT) attacks comprises: a passive BAT attack defense module configured to defend against passive BAT attacks to a first device or a second device; an active BAT attack defense module configured to defend against active BAT attacks to the first device or the second device; and an allowlist configured to allow communication between the first device and the second device.

Implementations may include some or all of the following features. The first device and the second device are Bluetooth Low Energy (BLE) devices, and wherein the first device is a central device and the second device is a peripheral device. The passive BAT attack defense module is configured to randomize synchronization between the first device and the second device, and randomize an interval between the first device and the second device. Randomizing synchronization between the first device and the second device is based on a distance between the first device and the second device, wherein when the distance between the first device and the second device is less than or equals a predetermined threshold, then the first device and the second device cannot independently start their own randomization, and wherein when the distance between the first device and the second device is greater than the predetermined threshold, then the first device and the second device can independently start their own randomization. The active BAT attack defense module is configured to perform Resolvable Private Address (RPA) generation between a first device and a second device, and perform RPA resolution between the first device and the second device. The performing RPA generation comprises generating a one-time only RPA-type media access control (MAC) address using a timestamp (which is more effective when compared with storage-based defense or sequence number-based defense), and the performing the RPA resolution comprises obtaining the timestamp and determining whether it is within a range to ensure the MAC address is not replayed by an attacker.

As used herein, the singular form "a," "an," and "the" include plural references unless the context clearly dictates otherwise.

As used herein, the terms "can," "may," "optionally," "can optionally," and "may optionally" are used interchangeably and are meant to include cases in which the condition occurs as well as cases in which the condition does not occur.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

It should be understood that the various techniques described herein may be implemented in connection with hardware components or software components or, where appropriate, with a combination of both. Illustrative types of hardware components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of defending against passive Bluetooth Address Tracking (BAT) attacks, the method comprising:
   randomizing synchronization between a first device and a second device;
   randomizing a time interval between the first device and the second device; and
   establishing communication between the first device and the second device in accordance with the time interval, wherein randomizing synchronization between the first device and the second device is based on a distance between the first device and the second device, and wherein when the distance between the first device and the second device is less than or equals a predetermined threshold, then the first device and the second device cannot independently start their own randomization.

2. The method of claim 1, further comprising performing synchronization error correction after randomizing the interval.

3. The method of claim 1, wherein the first device and the second device are Bluetooth Low Energy (BLE) devices.

4. The method of claim 1, wherein the first device is a central device and the second device is a peripheral device.

5. The method of claim 1, wherein when the distance between the first device and the second device is greater than the predetermined threshold, then the first device and the second device can independently start their own randomization.

6. The method of claim 1, further comprising determining whether the first device and the second device are close to each other or far from each other, and the randomizing synchronization is based on whether the first device and the second device are close to each other or far from each other.

7. A method of defending against active Bluetooth Address Tracking (BAT) attacks, the method comprising:
performing Resolvable Private Address (RPA) generation between a first device and a second device;
performing RPA resolution between the first device and the second device; and
establishing communication between the first device and the second device,
wherein the performing RPA generation comprises generating a one-time only RPA-type media access control (MAC) address using a timestamp.

8. The method of claim 7, wherein the first device and the second device are Bluetooth Low Energy (BLE) devices.

9. The method of claim 7, wherein the first device is a central device and the second device is a peripheral device.

10. A method of defending against active Bluetooth Address Tracking (BAT) attacks, the method comprising:
performing Resolvable Private Address (RPA) generation between a first device and a second device;
performing RPA resolution between the first device and the second device; and
establishing communication between the first device and the second device, wherein the performing the RPA resolution comprises obtaining a timestamp and determining whether it is within a range to ensure the MAC address is not replayed by an attacker.

11. The method of claim 10, wherein the first device and the second device are Bluetooth Low Energy (BLE) devices.

12. The method of claim 10, wherein the first device is a central device and the second device is a peripheral device.

13. A method of defending against active Bluetooth Address Tracking (BAT) attacks, the method comprising:
performing Resolvable Private Address (RPA) generation between a first device and a second device;
performing RPA resolution between the first device and the second device; and
establishing communication between the first device and the second device, further comprising enabling an allowlist at the first device.

14. The method of claim 13, wherein the first device and the second device are Bluetooth Low Energy (BLE) devices.

15. The method of claim 13, wherein the first device is a central device and the second device is a peripheral device.

16. A system for defending against Bluetooth Address Tracking (BAT) attacks, the system comprising:
a passive BAT attack defense module configured to defend against passive BAT attacks to a first device or a second device;
an active BAT attack defense module configured to defend against active BAT attacks to the first device or the second device; and
an allowlist configured to allow communication between the first device and the second device.

17. The system of claim 16, wherein the first device and the second device are Bluetooth Low Energy (BLE) devices, and wherein the first device is a central device and the second device is a peripheral device.

18. The system of claim 16, wherein the passive BAT attack defense module is configured to randomize synchronization between the first device and the second device, and randomize an interval between the first device and the second device.

19. The system of claim 18, wherein randomizing synchronization between the first device and the second device is based on a distance between the first device and the second device, wherein when the distance between the first device and the second device is less than or equals a predetermined threshold, then the first device and the second device cannot independently start their own randomization, and wherein when the distance between the first device and the second device is greater than the predetermined threshold, then the first device and the second device can independently start their own randomization.

20. The system of claim 16, wherein the active BAT attack defense module is configured to perform Resolvable Private Address (RPA) generation between a first device and a second device, and perform RPA resolution between the first device and the second device.

21. The system of claim 20, wherein the performing RPA generation comprises generating a one-time only RPA-type media access control (MAC) address using a timestamp, and wherein the performing the RPA resolution comprises obtaining the timestamp and determining whether it is within a range to ensure the MAC address is not replayed by an attacker.

* * * * *